(12) United States Patent
Botea et al.

(10) Patent No.: US 11,023,833 B2
(45) Date of Patent: Jun. 1, 2021

(54) PRO-ACTIVE FUEL AND BATTERY REFILLING FOR VEHICLES

(71) Applicant: International Business Machines Corporation, Armonk, NY (US)

(72) Inventors: Adi Ionel Botea, Dublin (IE); Fan Xie, Edmonton (CA)

(73) Assignee: International Business Machines Corporation, Armonk, NY (US)

(*) Notice: Subject to any disclaimer, the term of this patent is extended or adjusted under 35 U.S.C. 154(b) by 1136 days.

(21) Appl. No.: 14/983,630

(22) Filed: Dec. 30, 2015

(65) Prior Publication Data

US 2017/0193424 A1 Jul. 6, 2017

(51) Int. Cl.

| | |
|---|---|
| *G06Q 10/06* | (2012.01) |
| *G06Q 10/04* | (2012.01) |
| *G06Q 50/06* | (2012.01) |
| *H04W 4/021* | (2018.01) |
| *G08G 1/00* | (2006.01) |
| *G06F 16/2457* | (2019.01) |
| *G06F 16/29* | (2019.01) |

(52) U.S. Cl.
CPC ......... *G06Q 10/063114* (2013.01); *G06F 16/24575* (2019.01); *G06Q 10/047* (2013.01); *G06Q 50/06* (2013.01); *G08G 1/202* (2013.01); *G08G 1/205* (2013.01); *H04W 4/021* (2013.01); *G06F 16/29* (2019.01)

(58) Field of Classification Search
CPC ...... G06Q 10/00; G06Q 30/02; G06Q 10/047; G06Q 10/063114; G06Q 50/06; G06K 9/00798; G06K 9/6267; G06K 9/6218; G06K 9/6201; G06T 7/004; G06F 17/30241; H04W 4/021; G01C 21/3407; G01C 21/3667; G01C 21/3691
USPC .............................................. 705/7.11–7.42
See application file for complete search history.

(56) References Cited

U.S. PATENT DOCUMENTS

| | | | | |
|---|---|---|---|---|
| 5,055,851 | A | * 10/1991 | Sheffer | ............... B60R 25/102 342/457 |
| 6,298,306 | B1 | * 10/2001 | Suarez | ................ G01S 5/0018 701/300 |
| 7,778,773 | B2 | 8/2010 | Yaqub et al. | |
| 8,504,236 | B2 | 8/2013 | Guo et al. | |

(Continued)

FOREIGN PATENT DOCUMENTS

| | | |
|---|---|---|
| CN | 1507171 | 6/2004 |
| CN | 202887470 | 4/2013 |
| CN | 103218634 | 7/2013 |

OTHER PUBLICATIONS

Ma et al., User-driven cloud transportation system for smart driving, Dec. 1, 2012, 4th IEEE International Conference on Cloud Computing Technology and Science Proceedings, pp. 658-665 (Year: 2012).*

(Continued)

*Primary Examiner* — Robert D Rines
(74) *Attorney, Agent, or Firm* — Fleit Intellectual Property Law; Jon Gibbons

(57) ABSTRACT

A pro-active mobile refueling service uses a multiple agents and targets solution to assign mobile service agents to re-fuel moving vehicles. A subscription service continually monitors the fuel consumption and fuel reserves of subscribed moving vehicles to predict when a subscribed vehicle will need fuel replenishing.

19 Claims, 10 Drawing Sheets

(56) References Cited

U.S. PATENT DOCUMENTS

| | | | |
|---|---|---|---|
| 8,572,001 | B2 | 10/2013 | Hollis |
| 8,738,277 | B1 | 5/2014 | Kurosawa et al. |
| 8,756,248 | B1* | 6/2014 | Rickrode ............... G06F 16/27 |
| | | | 707/770 |
| 8,849,555 | B2 | 9/2014 | Scofield et al. |
| 9,053,588 | B1* | 6/2015 | Briggs ................... G07C 5/006 |
| 9,163,953 | B2* | 10/2015 | Tuzi ........................ B60K 15/00 |
| 2004/0107110 | A1 | 6/2004 | Gottlieb et al. |
| 2006/0005897 | A1 | 1/2006 | Kirshensteyn |
| 2008/0114528 | A1* | 5/2008 | Seacat ................ G01C 21/3438 |
| | | | 701/117 |
| 2009/0233572 | A1 | 9/2009 | Basir |
| 2010/0094496 | A1* | 4/2010 | Hershkovitz ............. B60L 3/12 |
| | | | 701/22 |
| 2010/0323657 | A1 | 12/2010 | Barnard et al. |
| 2011/0032110 | A1* | 2/2011 | Taguchi .................... B60L 3/12 |
| | | | 340/636.1 |
| 2011/0218933 | A1 | 9/2011 | Hunsaker et al. |
| 2012/0303397 | A1* | 11/2012 | Prosser ................... B60L 53/57 |
| | | | 705/7.12 |
| 2013/0226441 | A1* | 8/2013 | Horita ................ G01C 21/3469 |
| | | | 701/118 |
| 2015/0154638 | A1 | 6/2015 | Burlingham et al. |
| 2015/0339923 | A1* | 11/2015 | Konig .................... G08G 1/202 |
| | | | 701/522 |
| 2016/0117636 | A1* | 4/2016 | Miller .................... G06Q 50/30 |
| | | | 705/332 |
| 2016/0311410 | A1* | 10/2016 | Donzis .................... G01S 19/13 |

OTHER PUBLICATIONS

Isaza, A., et al., "A Cover-Based Approach to Multi-Agent Moving Target Pursuit", Proceedings of the Fourth Artificial Intelligence and Interactive Digital Entertainment Conference, Oct. 22-24, 2008, pp. 1-6.

Lagoudakis, M., et al., "Auction-Based Multi-Robot Routing", Robotics: Science and Systems, Jul. 13-17, 2005, pp. 1-8, vol. 5.

Botea, A., "Ultra-fast Optimal Pathfinding without Runtime Search", Proceedings of the Seventh Artificial Intelligence for Interactive Digital Entertainment Conference, Jan. 2011, pp. 1-7.

Botea, A., et al. "Moving Target Search with Compressed Path Databases", Proceedings of the 23rd International Conference on Automated Planning and Scheduling, Jun. 10-14, 2013, pp. 1-5.

Goldenberg, M., et al., "Multiple Agents Moving Target Search", Apr. 11, 2003, Proceedings of the International Joint Conference on Artificial Intelligence, pp. 1-13.

Hopcroft. J. E., et al., "A review of: An n5/2 algorithm for maximum matchings in bipartite graphs", 1973, pp. 1-8.

Klampfl, E., et al., "Intelligent Refueling Advisory System", In Proceedings of The 2nd Workshop on Intelligent Vehicle Control Systems, May 11-15, 2008, pp. 1-13.

Moldenhauer, C., et al, "Optimal Solutions for Moving Target Search" (Extended Abstract), Proceedings of the 8th International Conference on Autonomous Agents and Multiagent Systems, May 10-15, 2009, pp. 1-2.

Sun, X., et al., "Moving Target D* Lite", Proceedings of the 9th International Conference on Autonomous Agents and Multiagent Systems, May 10-14, 2010, pp. 1-8.

Munkres, J., "Algorithms for the Assignment and Transportation Problems", Journal of the Society for Industrial and Applied Mathematics, Mar. 1957, pp. 1-8, vol. 5, No. 1.

Hahn, G., et al., "A note on k-cop, l-robber games on graphs", Discrete Mathematics, Jul. 2006, pp. 1-6, vol. 306, Issue 19.

Vieira, M.A., et al., "Scalable and Practical Pursuit-Evasion", Second International Conference on Robot Communication and Coordination, May 2009, pp. 1-7.

Koenig, S., et al., "Speeding up Moving-Target Search", 2007 International Conference on Autonomous Agents and Multiagent Systems, May 14-18, 2007, pp. 1-8.

Sturtevant, N., "Benchmarks for Grid-Based Pathfinding", IEEE Transactions on Computational Intelligence and AI in Games, Jun. 2012, pp. 1-6, vol. 4, Issue 2.

Sun, X., et al., "Incremental ARA: An Incremental Anytime Search Algorithm for Moving Target Search", 22nd International Conference on Automated Planning and Scheduling, Jun. 25-29, 2012, pp. 1-9.

Vidal, R., et al., "Probabilistic Pursuit-Evasion Games: Theory, Implementation and Experimental Evaluation", IEEE Transactions on Robotics and Automation, Oct. 2002, pp. 1-8.

Vieira, M.A., et al., "Optimal Policy in Discrete Pursuit-Evasion Games", Department of Computer Science, University of Southern California, Jan. 2008, pp. 1-7.

Ishida, T., et al, "Moving Target Search", Proceedings of the 12th International Joint Conference on Artificial Intelligence, Aug. 24-30, 1991, pp. 1-7.

Baier, J. et al., "A Fast Algorithm for Catching a Prey Quickly in Known and Partially Known Game Maps", IEEE Transactions on Computational Intelligence and AI in Games 2014, Jul. 2014, pp. 1-8, vol. 7, Issue 2.

Bopardikar, S., et al., "Dynamic Vehicle Routing with Moving Demands—Part I: Low Speed demands and high arrival rates", Proceedings of the American Control Conference, Jun. 10-12, 2009, pp. 1-8.

Agharkar, P., et al., "Vehicle Routing Algorithms to Intercept Escaping Targets", Proceedings of the American Control Conference, Jun. 4-6, 2014, pp. 1-6.

Ding, Y., et al, "Moving Target Oriented Opportunistic Routing Algorithm in Vehicular Networks", International Journal of Distributed Sensor Networks, Apr. 2013, pp. 1-11.

Helvig, C.S., et al., "Moving-Target TSP and Related Problems", Sixth Annual European Symposium on Algorithms, Aug. 24-26, 1998, pp. 1-12.

Berbeglia, G., et al., "Dynamic Pickup and Delivery Problems", European Journal of Operational Research, Nov. 18, 2010, pp. 1-24, vol. 202, Issue 1.

Bouros, P., et al., "Dynamic Pickup and Delivery with Transfers", Advances in Spatial and Temporal Databases, Aug. 2011, pp. 1-18.

U.S. Appl. No. 14/498,327, filed Sep. 26, 2014.

\* cited by examiner

700

*disMatrix*

|  | T1 | T2 | T3 |
|---|---|---|---|
| A1 | 1.5 | 11.5 | 8.5 |
| A2 | 9.0 | 1.7 | 10.5 |

PRO-ACTIVE FUEL AND BATTERY REFILLING FOR VEHICLES

BACKGROUND

The present disclosure generally relates to optimizing refueling for vehicles, and more specifically to refueling moving vehicles.

Many forms of roadside assistance are available today. The current model is for a vehicle operator to make a call for assistance and then wait for a fuel/battery charge. Electric vehicles (EVs) have limited range and currently there is very little infrastructure (fixed battery stations) in place. A network of fixed battery stations along the lines of current petrol stations is very expensive to implement.

BRIEF SUMMARY

Briefly, in one embodiment of the present disclosure, a computer-implemented method for pro-active mobile refueling of a target vehicle uses a remote device to monitor a fuel status of the target vehicle and perform: generating a map with positions of multiple target vehicles and multiple service agents; receiving an indicator that a fuel level of the target vehicle has fallen below a threshold level; determining that the target vehicle will need fuel replenishing; and dispatching an assigned service agent to reach the target vehicle and perform the replenishing, wherein the target vehicle can remain in motion until the assigned service agent has reached it.

In a further embodiment, the method performs the following once it is determined that the target vehicle needs fuel: generating a distance matrix of current distances between available service agents and target vehicles; computing an assignment between a service agent and the target vehicle; computing moves guiding the assigned service agent to the target vehicle; dispatching the assigned service agent; and continually updating the location of the target vehicle.

In another embodiment, an information processing method for pro-active mobile refueling of a target vehicle includes a service computer monitoring a fuel status of the target vehicle. The service computer includes: a memory storing instructions; a location-determining system; and a processor operably coupled with the location-determining system and the memory, for executing instructions that include: generating a map with positions of multiple target vehicles and multiple service agents; receiving an indicator that a fuel level of a target vehicle has fallen below a threshold level; determining that the target vehicle needs fuel; and dispatching a service agent to the target vehicle to perform the fuel replenishing.

In another embodiment, a computer program product for pro-active mobile refueling of a target vehicle includes a storage medium for performing the method as described above at a remote device monitoring a fuel status of the target vehicle.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 7 is an illustration of a distance matrix, according to one embodiment of the present disclosure;

DETAILED DESCRIPTION

Figure 1:
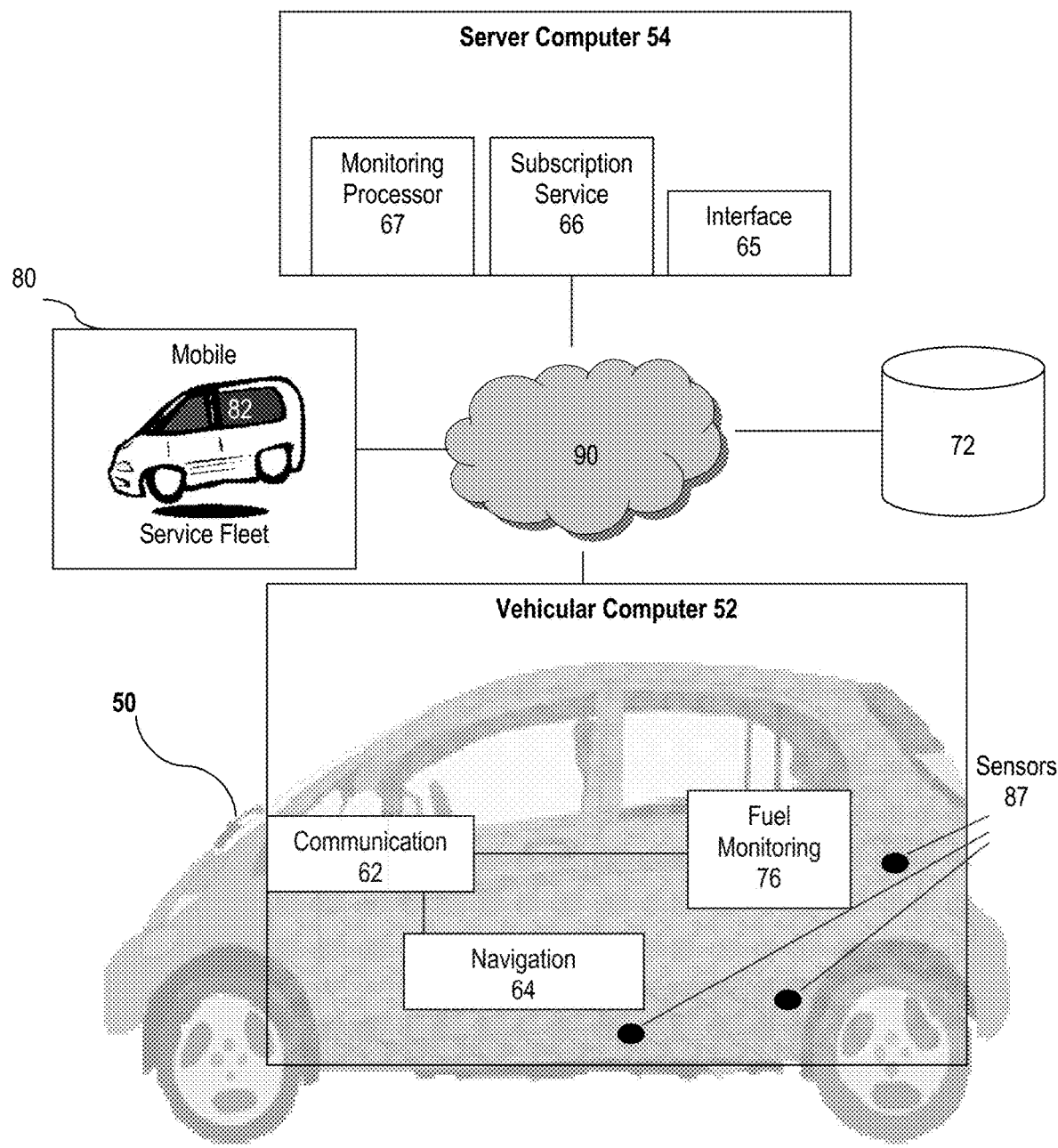
FIG. 1 is a block diagram illustrating one example of an operative environment in which the anti-pattern identification method can be implemented, according to one embodiment of the present disclosure.

In an illustrative embodiment, it is recognized that the term "fuel" within the specification is used to refer to not only gasoline (petrol), but battery power, current, or any other means for providing energy to a vehicle for propulsion.

In accordance with various aspects of the disclosure, a mechanism, system and method is disclosed for pro-active mobile refueling using a multiple agents and targets solution to assign service agents to re-fuel moving vehicles. Vehicles can be refueled "on the go" without restricting the vehicles to a specific path towards a fueling station. Mobile service agents are dispatched to "chase" the target vehicles and provide refueling after the target vehicle is "caught."

In accordance with an embodiment of the present disclosure, a subscription service is disclosed that continually monitors the fuel consumption and fuel reserves of subscribed moving vehicles. A user of a subscribed vehicle need not worry about running out of fuel before reaching a service station. The pro-active mobile refueling service predicts when a subscribed vehicle will run out of fuel and sends service vehicles to chase it. The user of the moving vehicle does not need to stop and wait for fuel; the fuel is brought to the vehicle.

The pro-active mobile refueling service is particularly beneficial for electric vehicles which have limited battery power, as compared to internal combustion vehicles which can run hundreds of miles on one tank of petrol. The pro-active mobile refueling service effectively extends the range of electric vehicles, allowing for worry-free long road trips. The cost savings are significant because it eliminates the need to build a network of fixed battery stations as in the current petrol station paradigm. Instead, a fleet of service agents is dispatched to deliver EV batteries or battery charging when needed.

It is recognized that the term electric vehicle (EV) within the specification is used to refer to all plug-in vehicles, such as hybrid vehicles and pure battery electric vehicles. Initially, EVs were cost-prohibitive due to the price of their battery packs which commonly use expensive lithium-ion battery cells. This has rapidly changed since 1997 when the first Prius® was sold by Toyota Motor Corporation. Battery prices have fallen substantially and are expected to achieve cost parity with internal combustion vehicles in 2020 when EV battery costs are projected to hit $300 per kilowatt-hour (kWh). More than 700,000 plug-in vehicles have been sold worldwide by the end of 2014. The automotive industry now offers dozens of models of electric cars and vans. It is expected that the combination of falling battery costs and market penetration will drive growth in EV purchases.

In accordance with an embodiment of the present disclosure, the pro-active mobile refueling method leverages technological advances now commonly available in motor vehicles, such as location identification technology using global positioning systems (GPS); automobile navigation systems; low battery/fuel detectors; and mobile communication systems including screen displays combined with audio features.

Pro-Active Mobile Refueling System—FIG. 1

FIG. 1 is an exemplary diagram of a possible information processing environment in which illustrative embodiments may be implemented. It should be appreciated that FIG. 1 is only exemplary and is not intended to assert or imply any limitation with regard to the environments in which different embodiments may be implemented. Many modifications to the depicted environment may be made. Referring to FIG. 1, networked information processing system 100 is a network of computers in which illustrative embodiments may be implemented. Networked information processing system 100 contains network 90, which is the medium used to provide communication links among various devices and computers communicating within networked information processing system 100. Network 90 may include connections, such as wire, wireless communication links, and fiber optic cables, for facilitating communication among Vehicular Computer 52, Service Computer 54, Database 72, and Service Fleet 80. In other exemplary embodiments, networked information processing system 100 can include additional client or device computers, storage devices or repositories, server computers, and other devices not shown.

Vehicle 50 represents any moving vehicle with a propulsion system dependent on fuel, such as a car, van, or bus. Vehicle 50 can be a gas-powered, hybrid, or plug-in, car, van, motorcycle, truck, bus, or train. Vehicular Computer 52 can be, for example, a mobile device, a cell phone, a personal digital assistant, a network, a laptop computer, a tablet computer, or any other type of computing device. For exemplary purposes, however, we illustrate Vehicular Computer 52 as a vehicle computing system residing within Vehicle 50 and including, inter alia, a navigation system 64 including a global positioning system (GPS), a communications subsystem 62 including a screen display, sensors 87, and a vehicular fuel monitoring system 76.

Service computer 54 includes an interface 65. The interface 65 may accept commands, data entry, and input from fuel stations including pricing and promotions. The interface 65 can be a command line interface, a graphical user interface (gui), or a web user interface (wui). The service computer 54 also includes a monitoring processor 67 and subscription service subsystem 66.

The mobile service fleet 80 is monitored by the monitoring processor 67 and includes multiple, service agents 82. The service agents 82 can themselves be either gas-powered or plug-in vehicles. In an embodiment of the disclosure the service agents 82 are light service vehicles, as opposed to heavy trucks carrying a large amount of fuel, for better handling, speed, and safety and environmental concerns. In one embodiment, the service agent 82 is an unmanned aerial vehicle (UAV) or "drone."

Figure 2:
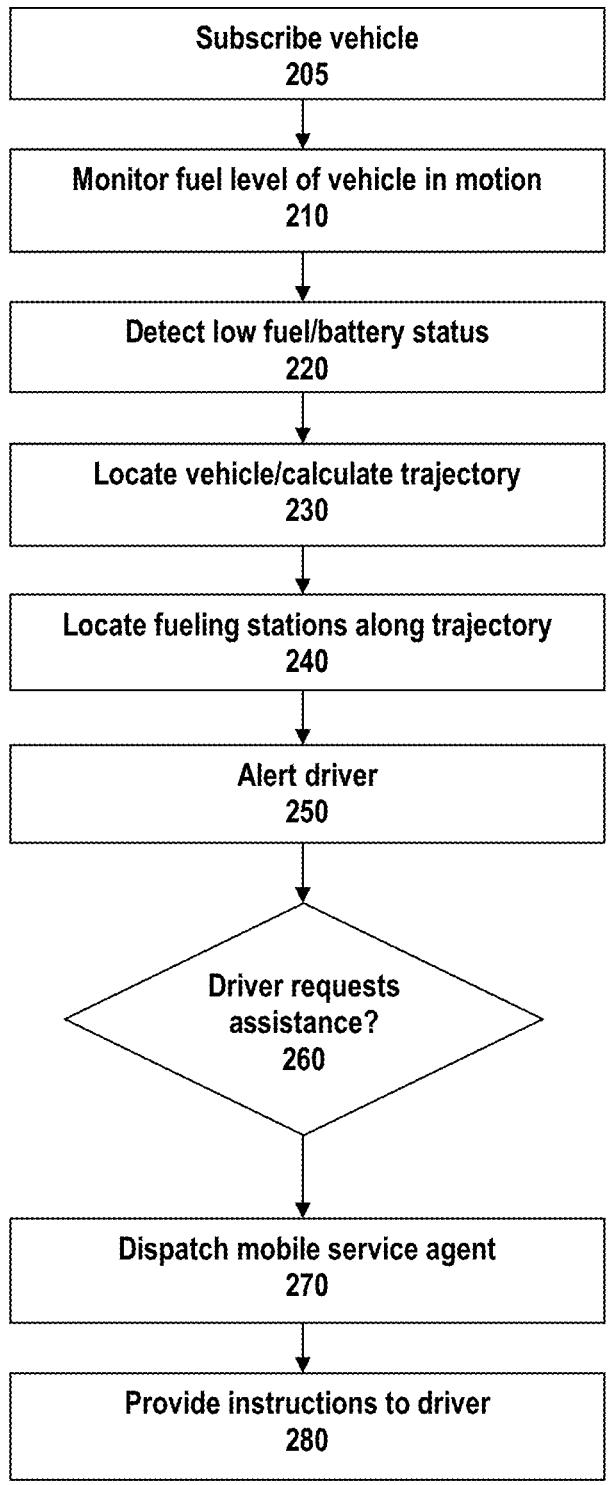
FIG. 2 is an operational flow diagram of the pro-active mobile refueling process, according to one embodiment of the present disclosure.

Pro-Active Mobile Refueling—FIG. 2

FIG. 2 shows an operational flow diagram of a method for pro-active mobile refueling, according to an embodiment herein. In a first step, 205, the pro-active mobile fueling service 66 is a subscription service that subscribes a vehicle 50 to the service. When a vehicle 50 is subscribed to the service 66, vehicle information is provided to the service computer 54 and stored in database 72. Once a vehicle 50 is signed up to the service 66, threshold fuel levels are established for the vehicle 50.

Figure 8:
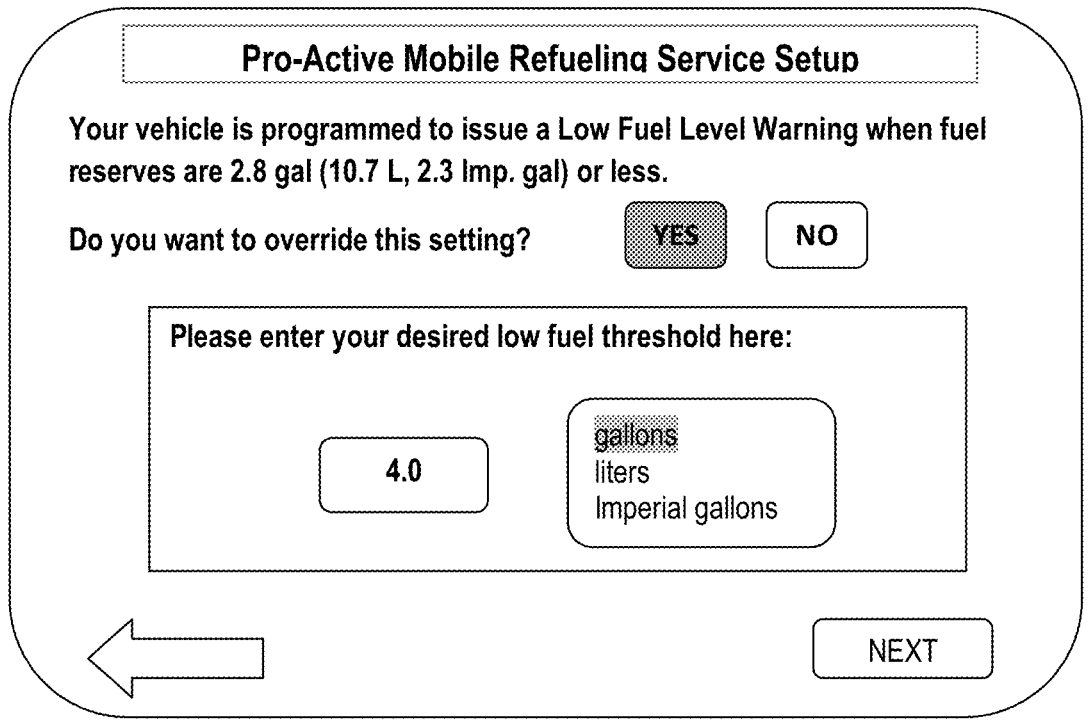
FIG. 8 is an illustration of an exemplary graphical user interface for setting fuel threshold levels, according to one embodiment of the present disclosure.

The user of the service 66 is given an opportunity to accept a default threshold fuel level or supply another threshold level (as shown in FIG. 8). The default threshold fuel level can be set by the vehicle maker. For example, the vehicle maker may recommend that the fuel within the vehicle not fall below one-quarter of the total fuel reserves of the vehicle. Falling below one-quarter of the total fuel prompts a "low fuel warning" to an operator of the vehicle 50. A user of the service 66 can bypass the manufacturer's default setting and set the threshold fuel level to another point. As an example, assume a vehicle operator subscribes to the service 66 and sets the threshold level to one-half of the total fuel of the vehicle 50. The user may specify that a warning should be issued once the fuel falls below the user-defined threshold level of one-half.

As part of the service 66, the service computer 54 pro-actively monitors the vehicle 50, receiving regular fuel status updates from the vehicular computer 52. The vehicular computer 52 monitors the fuel consumption of the vehicle 50 and the amount of fuel remaining. This information is provided to the service computer 54 through network 90. In addition to monitoring the fuel status, the service computer 54 is in communication with the on-board navigation system 64 and receives route information. The vehicle's 50 routes are stored in database 72 and a route history is established as part of the subscription service 66. For example, once subscribed, a user may be prompted to enter routine routes, such as home→work, work→gym, school→work, and the locations of often-visited sites, such as grocery stores and schools. In addition to the routine routes, the service 66 will also track and store other trips as non-routine routes.

In step 220, the service computer 54 determines that the fuel level has fallen below the threshold fuel level established for the vehicle 50 through the subscription service 66. The low fuel level indication triggers a response. In step 230 the service computer 54 determines the current location of the vehicle 50 and, using the current location and the routine and non-routine route data stored in the database 72, calculates an expected trajectory. For example, is vehicle 50 on the routine route designed as "school→work?" If so, service computer 54 calculates the number of miles remaining on the route "school→work." As part of this calculation, service computer 54 calculates the number of miles until the vehicle 50 reaches destination "work." The average and expected fuel mileage of the vehicle 50 is determined, for example by the fuel monitoring processor 67, accounting for speed, road conditions, and other feedback from sensors 87 within the vehicle 50.

In step 240 fueling stations along the trajectory of the assumed route are located. In step 250 the driver is alerted to the low fuel level and also advised of any convenient fueling stations along the assumed route. A list of fuel stations en route to the destination is generated and presented to the user through the communication subsystem 62 of the vehicle 50, or alternately, to the user's personal device. The list of fuel stations includes fuel stations that are within driving range of the vehicle 50 based on the fuel mileage of the vehicle 50, and other factors, such as road conditions and weather. The list can include the price of the fuel and the brand of the fuel at each of the fuel stations. Particularly in case of EVs, it may be that there are no convenient fueling stations along the route. This information is communicated to the user.

In step 260 the vehicle operator is asked if assistance is required. If the answer is Yes, then in step 270 the service computer 54 dispatches a mobile service agent 82 and in step 280 the operator is advised that a mobile service agent 82 has been dispatched to bring fuel. Instructions for accepting the refueling are also provided to the operator.

The decision about the right time to start a chase is closely related to the determination that servicing is needed. In one embodiment, a mobile service agent 82 can be dispatched as soon as the need for servicing is determined. The rationale is that it doesn't hurt to refuel a vehicle sooner rather than later. In another embodiment, one can take into account that some vehicles can be in a more urgent need for help than others, depending for instance on the fuel range and fuel consumptions levels of each vehicle. Thus, when the number of vehicles 50 that need help exceeds the number of mobile service agents 82 available, the method can assign a mobile service agent 82 only to a subset of more urgent cases. Later, at subsequent iterations of the method, the remaining vehicles 50 would get their chance of being assigned a mobile service agent 82.

Pro-Active Mobile Refueling Subscription Service

The pro-active mobile refueling subscription service 66 is able to predict what vehicles 50 will need assistance based on 1) battery (fuel) level; 2) predicted trajectory (routine or non-routine); 3) availability of static recharging facilities along the trajectory; 4) the vehicle's 50 current location. Once activated by a low-fuel level warning, the monitoring processor 67 confirms with the vehicle operator if help is needed. If the operator asks for help in refueling, the service 66 employs a novel version of a multi-hunter, multi-prey search process to dispatch the service agent 82 to "catch" the vehicle 50 for refueling. The service agents 82 are the "hunters" or "agents" in this search process. The service agents 82 will chase and meet with the vehicle ("prey" or "target") 50 that needs to be serviced.

The subscription service 66, through its monitoring processor 67 uses a variant of a multiple target search (MTS), where multiple agents chase multiple targets, called Multiple Agents and Targets (MAT). In MAT, agents are repeatedly reassigned to targets. The computation of each assignment (agent to target) considers the current positions of agents and targets, and ignores any possible future movements of the targets. This makes it possible to avoid running minimax searches, greatly reducing the computational costs.

Figure 3:
FIG. 3 is an illustration of a street map showing positions of targets and agents, according to one embodiment of the present disclosure.

Map—FIG. 3

Referring now to FIG. 3, there is shown a street map 300 with n agents and n targets. The agent A 310 is the service vehicle 82; the target T 320 is the moving vehicle 50 that needs fuel. An agent A 310 is only allowed to capture a target T 320 if and only if A 310 is assigned to chasing T 320 and A 310 and T 320 are in the same position. As in moving target search (MTS), a mobile agent chases a mobile target on a map 300, as in a police chase scenario. As a target's location changes, an agent A 310 needs to be able to adapt its strategy very quickly, making this a challenging real-time search problem. Alternative names for this type of search problem are: cops and robbers, hunter and prey, pursuers and evaders.

A given agent A 310 is never assigned to more than one target T 320 at a time. This choice is preferred for two reasons. First, assigning agents to one static target each is the well-known assignment problem, which can be solved optimally in polynomial time. In contrast, optimally assigning an agent A 310 to reach multiple targets T 320 in an optimal order can result in an NP-hard problem, even when the targets T 320 are static. Secondly, by the time an Agent A 310 catches the first moving target T 320, the agents and targets configuration could be changed so substantially that pursuing the next mobile target T 320 with the same agent A 310 might be very suboptimal.

Figure 4:
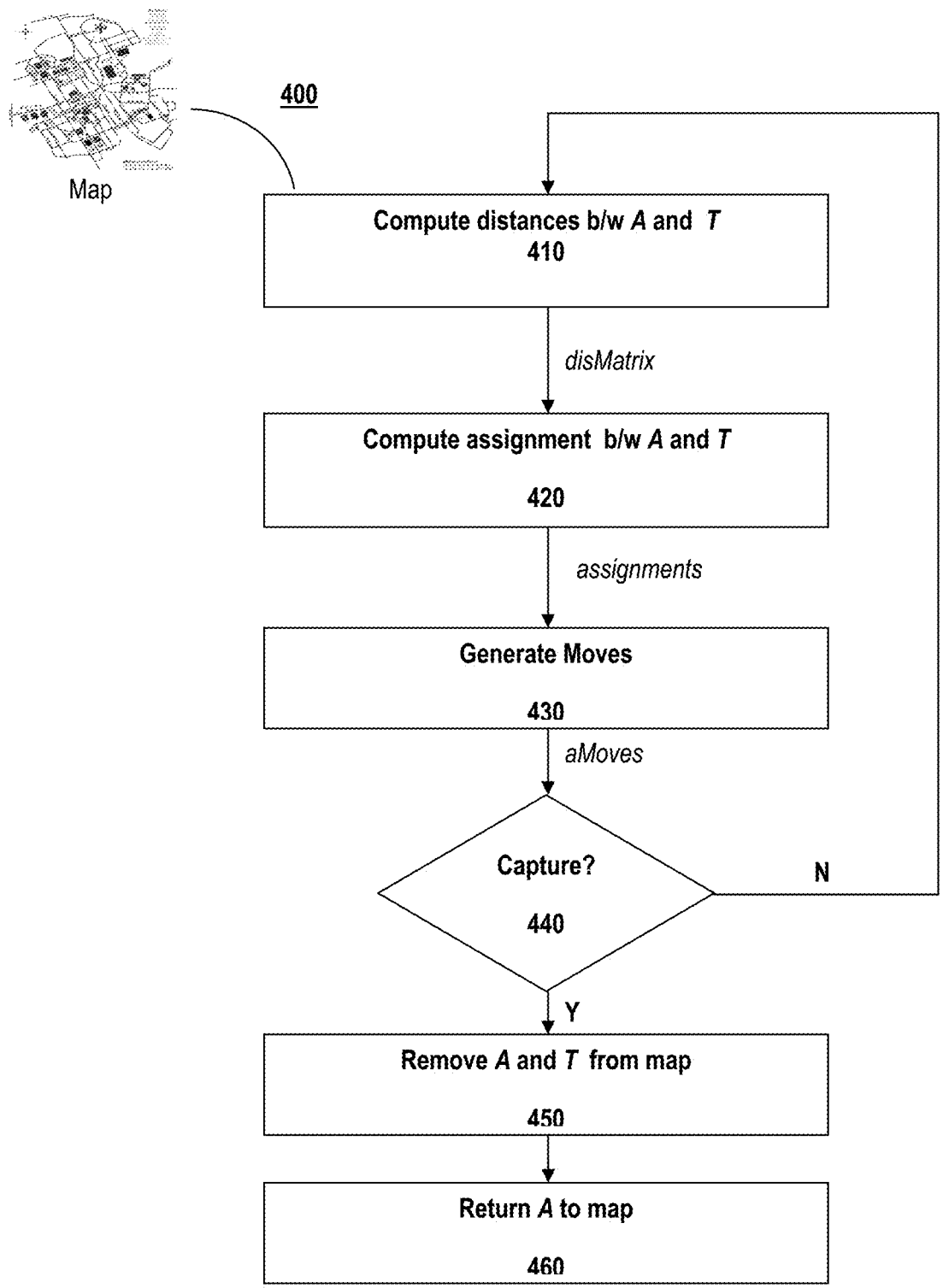
FIG. 4 is an operational flow diagram of the process of assigning an agent to a target, according to one embodiment of the present disclosure.

Multiple Agents and Targets—FIGS. 4 and 7

In applying MAT to the pro-active mobile fueling system 51, in step 270 from FIG. 2 ("Dispatch Mobile Service Agent") the Service Computer 54 computes an assignment of the mobile service agents 82 (agents A 310) to the moving vehicles 50 (targets T 320). FIG. 4 shows an operational flow diagram for the MAT method of dispatching agents A 310 to locate targets T 320. The input to the process is the map 300 showing the current positions of the agents A 310 and targets T 320 (aPos, tPos, map). The map 300 is stored in database 72, or retrieved from a third party source. The assumptions for the process are:

1) We assume that both the agents A 310 and the targets T 320 move in a static and fully known environment defined by a graph $G=(V,E)$, where the arcs in E correspond to the legal moves that any agent A 310 or target T 320 can perform. The positions of all agents A 310 and targets T 320 are fully known.

2) Agents and Targets: There are n Agents A 310 that chase n moving Targets T 320 in the graph. The movement of agents A 310 and targets T 320 occur in parallel.

3) Capture: An agent A 310 can capture a target T 320 if A 310 and T 320 are in the same location. Once a target T 320 is captured, the target T 320 is removed from the computation, since the target T 320 now represents a vehicle 50 that has been serviced. The agent A 310 that captures the target T 320 is also removed from the computation, but only temporarily. Clearly, while this service vehicle 82 is not done yet with the vehicle 50 at hand, it cannot be assigned to any other vehicle 50. Furthermore, after servicing a vehicle 50, the service agent 82 might or might not need some additional time to replenish its stock (e.g., fuel or batteries) before being ready to be assigned to other vehicles 50 in need for help. In practice, the agent A 310 will only capture T 320 if T 320 is the assigned target for A 310.

4) Objective: The multiple agents are aiming to capture all the moving targets.

Referring again to FIG. 4, the process begins at step 410, wherein a matrix (disMatrix) is generated of the current distances between agents A 310 and targets T 320 from the map 300. The distance matrix, as shown in FIG. 7, can be computed from a compressed distance database, such as Heuristic-Aided Compressed Distance Databases (HCD), or any other concise distance database that answers point-to-point distance queries quickly. Another option is to use heuristics, such as the Manhattan distance for 4-connected grid maps.

The distance matrix disMatrix, by default, contains the optimal distance or estimated distance between agents A 310 and targets T 320 (moving vehicles 50). The optimal distance can be retrieved from the Heuristic-Aided Compressed Distance Databases (HCD), or other source. Once we have the disMatrix with the current distances, in step 420 we compute the assignment of agents A 310 to targets T 320 in a sequence of independent single agent single moving target search problems, which can be solved by a set of online search algorithms, such as ARA* (an improved path planning algorithm for moving target search), or just simply being retrieved from a compressed path database (CPD). The assignments are computed without taking into consideration any possible future moves of the target T 320.

Lastly in step 430 we dispatch the agent A 310 according to the assignment. Once the target T 320 is captured in step 440, the involved agents A 310 and targets T 320 are removed from the map 300 in step 450. The agent A 310 is added back in step 460 when it is ready to service other cars, as explained earlier. If the target T 320 has not been captured, the process loops back to step 410. The process terminates when the target T 320 is captured.

Figure 5:
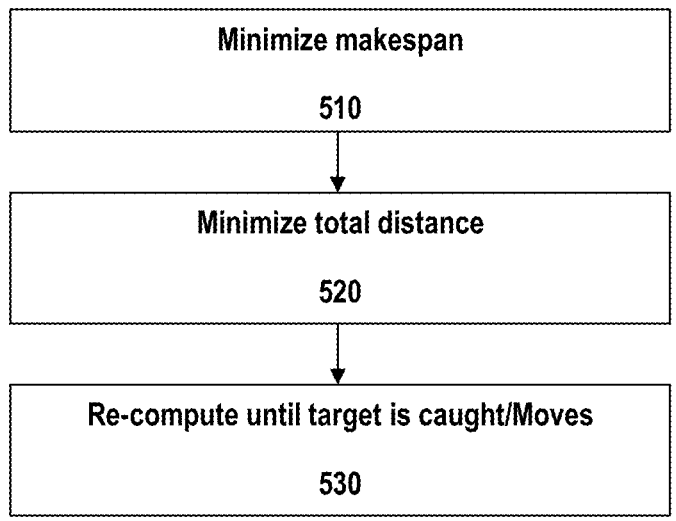
FIG. 5 is an operational flow diagram of the assignment computation method, according to one embodiment of the present disclosure.

Computing Assignments of Agents to Targets—FIG. 5

Function ComputeAssignment(disMatrix) computes an assignment between agents and targets. Only one agent A 310 is assigned to chase one target T 320. When there are more agents than targets, some agents are kept in reserve. When there are more targets, some targets are left without an assignment at the current iteration. This function is by default called every time before generating agent moves, so that one agent A 310 will not commit to one target T 320 all the time. The assignment computation considers several optimization criteria, such as minimizing the total distance between service agents and their assigned targets, minimizing the makespan (i.e., max distance between an agent and its target), and minimizing a combination of both, with the makespan being the main criterion. The assignment computation also considers the compatibility between the services provided by an agent A 310 and the needs of a target T 320. For instance, a target T 320 that needs petrol has to be serviced by an agent A 310 capable of providing petrol.

Because the targets T 320 in pro-active mobile fueling are moving vehicles 50, the previous assignment of an agent A 310 to a target T 320 might not be the optimal one that optimizes the desired metrics on the current map 300. For example, assume that an initial assignment involves two agents {A1,A2} and two targets {T1, T2}, where A1 is chasing T1 and A2 is chasing T2. It might be possible that A2 is closer to T1 than A1 and A1 is closer to T2 than A2 at some point. It is better to let A1 chase T2 and A2 chase T1 than committing to the initial assignment in this case. Each agent's next move can be computed by online search algorithms, but for the speed reason, we use the preprocessed compressed path database (CPD) to generate the next move toward the assigned target, which is shown to be much faster than other algorithms.

In order to simplify the agent-to-target assignment problem, one condition is relaxed—the mobility of targets T 320. If targets T 320 cannot move, given the distance matrix disMatrix 700 shown in FIG. 7, computing one-to-one assignments can be easily transformed to some classical assignment problems, based on the different metrics to optimize. We consider three optimizing metrics:

Minimize the total distance between agents A 310 and their assigned targets T 320;

Minimize the makespan, which is the maximal distance among the all assigned agent-target pairs;

Minimize both metrics, with the makespan being the main metric.

If relying on an optimal total cost strategy, we minimize the total distance. In considering real-life transportation problems, every single kilometer travelled by agents A 310 counts, since it consumes time for the drivers and fuel for the vehicles. In this sense, it is reasonable to minimize the total distance travelled by all agents, which can be easily transformed to the linear assignment problem (or the well-known minimum weight perfect bipartite match problem). The linear assignment problem can be solved by the Hungarian method, in which the worst case time complexity is $O(n^4)$, or by a linear programming solver.

Linear Assignment Problem: Given two sets A 310 and T 320 both with n elements, and a weight function C: A×T→R, find a bijection f: A→T that minimizes the cost function Sum_{a in A} C(a, f(a)).

Optimal Makespan Strategy: Minimize the Maximal Distance

In this strategy, we minimize the maximal distance of one chase. Consider a scenario where a number of police cars chase several suspect vehicles. This scenario applies to the mobile refueling scenario in that it is a time-urgent problem, therefore total travelled distance is not that important. The objective is to finish the chase as soon as possible. This can be represented by the linear bottleneck assignment problem (or the minimum makespan problem). The linear bottleneck assignment problem can be solved as a linear programming problem or as a modified bipartite match problem.

Linear Bottleneck Assignment Problem: Given two sets A 310 and T 320 both with n elements, and a weight function C: A×T→R, find a bijection f: A→T that minimizes the following function max_{a in A} C(a, f(a)).

Optimal Mixed Strategy: A Combination of Both Metrics—FIGS. 5 and 6

For the pro-active refueling paradigm, we consider both metrics, firstly minimizing the makespan, and later minimizing the total distance, in an Optimal Mixed Strategy Assignment. The Optimal Mixed Strategy Assignment proceeds as follows.

Referring now to FIG. 5, in step 510, from the matrix disMatrix 600, we find the minimum weight w such that after removing all edges with larger weight than w, there still exists one perfect match. Then, in step 520, find the minimum weight bipartite match in the map 300 after removing all edges with larger weight than w. This is one method used to solve the linear bottleneck assignment problem, as the Hungarian method was one method used to solve the linear assignment problem. For the optimal mixed strategy, frequently re-computing the assignments in step 530 improves the performance dramatically because of the dynamics of moving targets.

Figure 6:
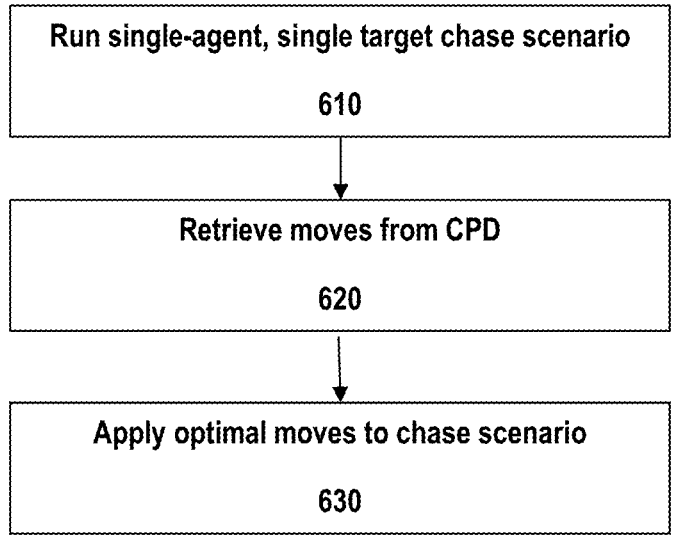
FIG. 6 is an operational flow diagram of the moves computation method, according to one embodiment of the present disclosure.

Computing Moves from Agents to Targets—FIG. 6

FIG. 6 is an operational flow diagram of the process for computing the moves in the optimal mixed strategy. In step 610, between two consecutive re-assignments from step 530 of FIG. 5, the method runs a series of independent single-agent, single-target chases. In each independent chase an agent A 310 utilizes optimal moves towards the current target T 320 position. The moves can be retrieved from a compressed path database (CPD) in step 620, following a state-of-the-art approach in single-agent, single-target MTS. This and the assignment calculation from FIG. 5 are two distinct parts of the method, each focusing on a different aspect. The assignment calculation determines what agent A 310 chases what target T 320. Once this is resolved, the CPD actually provides the moves to the agent A 310 in step 620. In step 630, using the moves, the agent A 310 heads towards the target T 320 and eventually catches it.

A commonly applied target strategy that can be used is the random strategy, where Agents A 310 repeatedly move towards a randomly selected point on an optimal path. This is helpful in the case when the Agents A 310 do not know the planned trajectory of the targets T 320.

Setting Fuel Threshold Level—FIG. 8

The subscription service 66 can communicate with the operator of the target vehicle 50 through a graphical user interface as shown in FIG. 8. Through the graphical user interface which can be coupled with a mobile phone or a vehicle display, a subscriber is able to customize the service provided to a vehicle 50. The default subscription if no customization is specified is where the subscription service 66 accepts all vehicle manufacturer settings. The settings can be provided to the service 66 from the vehicle itself or from database 72. For example, assume that the vehicle 50 under subscription automatically issues a low fuel warning to the operator when the fuel reserves are at or below 2.8 gallons. Accordingly, the subscription service 66 sets 2.8 gallons as its low fuel threshold. In the alternative, the subscriber is able to override this default setting and provide a custom setting.

FIG. 8 shows one exemplary screen 800 where a subscriber is able to provide a low fuel level threshold to override the manufacturer's setting. As shown in FIG. 8, the subscription service 66 will now use 4.0 gallons as the low fuel threshold instead of the manufacturer's setting of 2.8 gallons. It will be apparent that other customizations can be performed in a similar manner.

Figure 9:
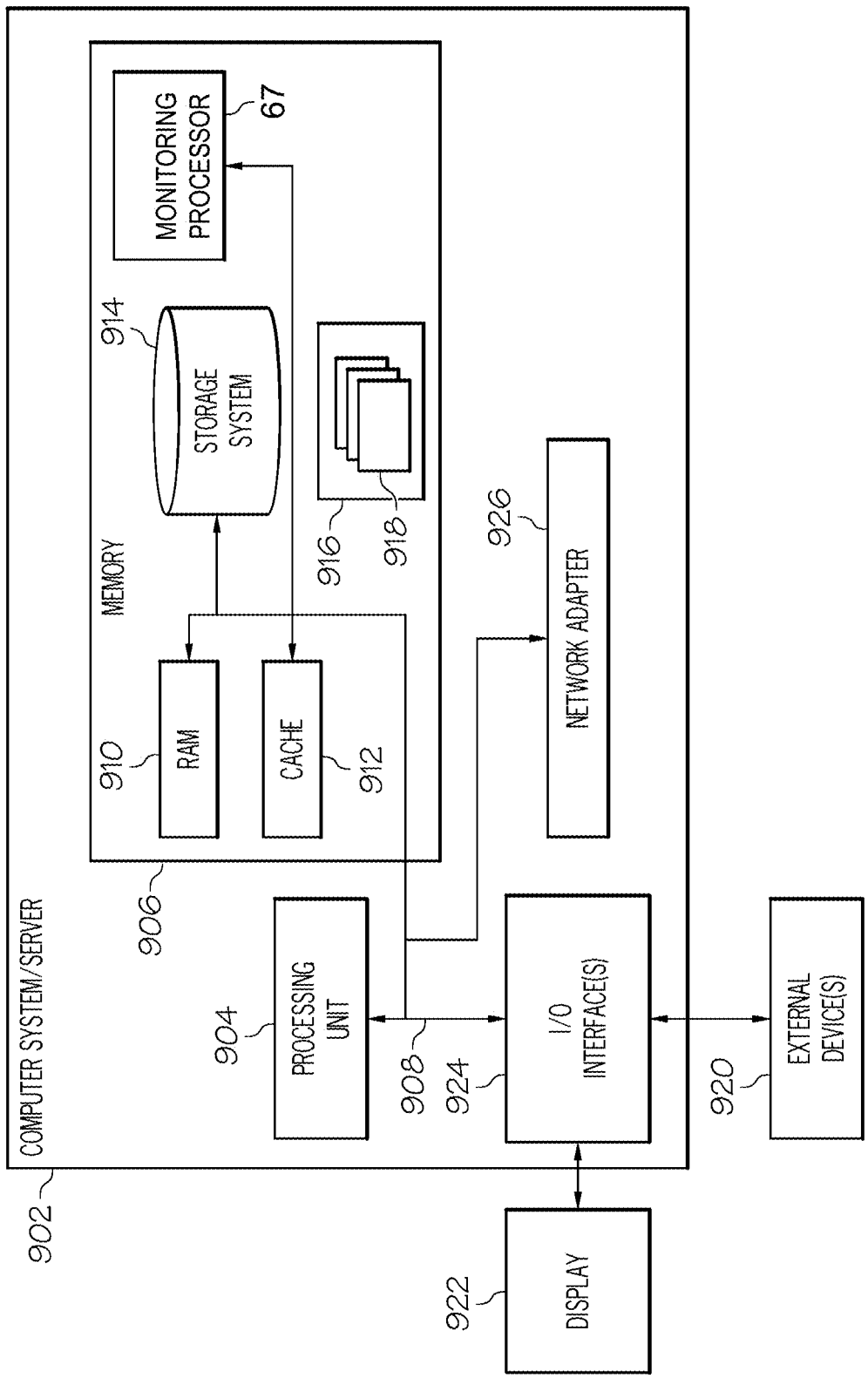
FIG. 9 is a block diagram illustrating a detailed view of an information processing system according to one embodiment of the present disclosure.

Hardware Embodiment—FIG. 9

FIG. 9 illustrates one example of the components of an information processing system 902 for pro-active mobile refueling that that can be utilized in various embodiments of the present disclosure. The information processing system 902 shown in FIG. 9 is only one example of a suitable system and is not intended to limit the scope of use or functionality of embodiments of the present disclosure described above. The information processing system 902 of FIG. 9 is capable of implementing and/or performing any of the functionality set forth above. Any suitably configured processing system can be used as the information processing system 902 in embodiments of the present disclosure.

The information processing system 902 is operational with numerous other general purpose or special purpose computing system environments or configurations. Examples of well-known computing systems, environments, and/or configurations that may be suitable for use with the information processing system 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 902 may be described in the general context of computer system-executable instructions, such as program modules, being executed by a computer system. Generally, program modules may include routines, programs, objects, components, logic, data structures, and so on that perform particular tasks or implement particular abstract data types. The information processing system 902 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 902 is in the form of a general-purpose computing device. The components of the information processing system 902 can include, but are not limited to, one or more processor devices or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906, in one embodiment, comprises the monitoring processor 67. Even though FIG. 9 shows the monitoring processor 67 residing in the main memory, the monitoring processor 67 or at least one of its components can reside within the processor 904, be a separate hardware component, and/or be distributed across a plurality of information processing systems and/or processors.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present invention.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present invention.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Figure 10:
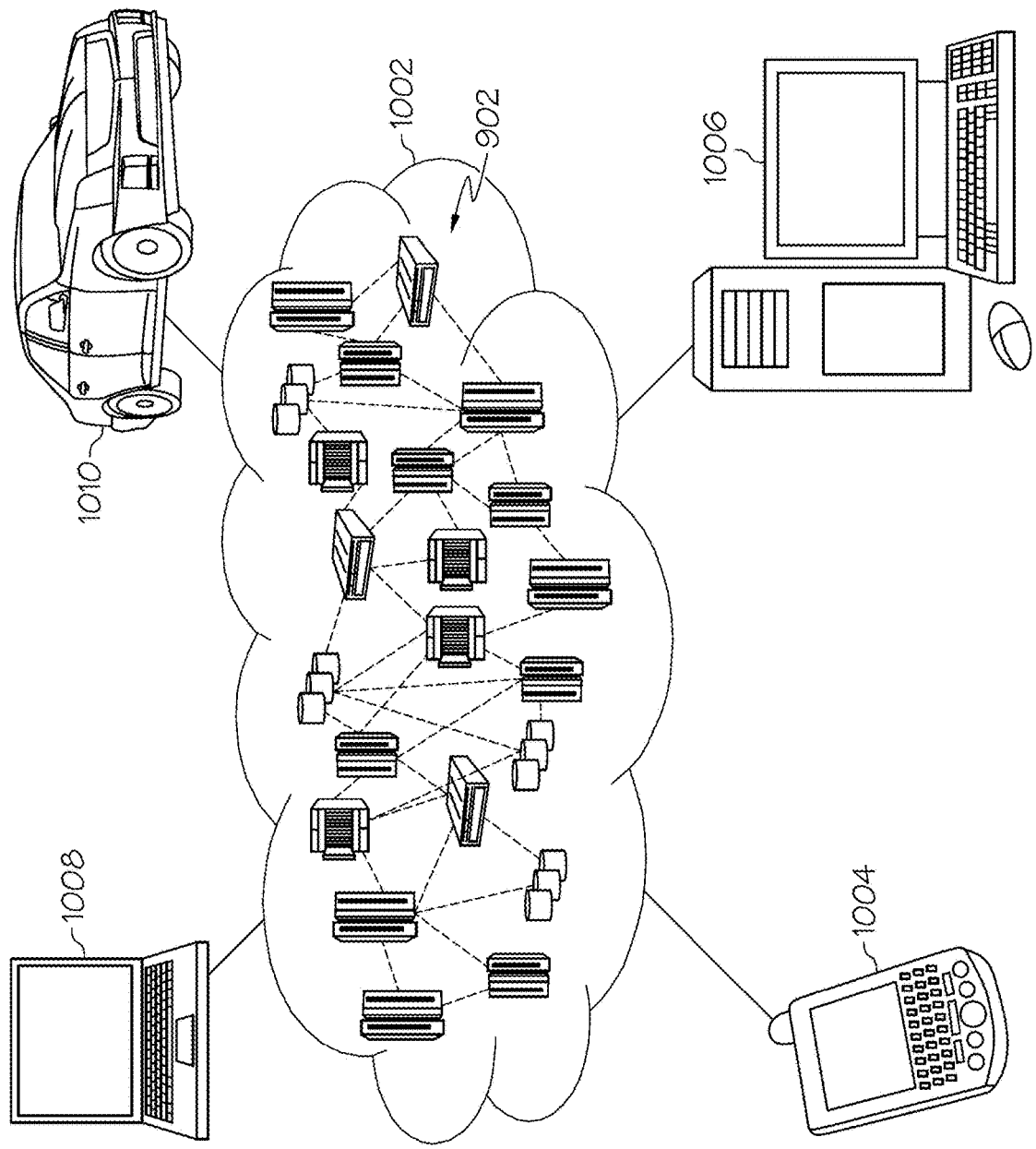
FIG. 10 illustrates one example of a cloud computing environment according to one example of the present disclosure.
Figure 11:
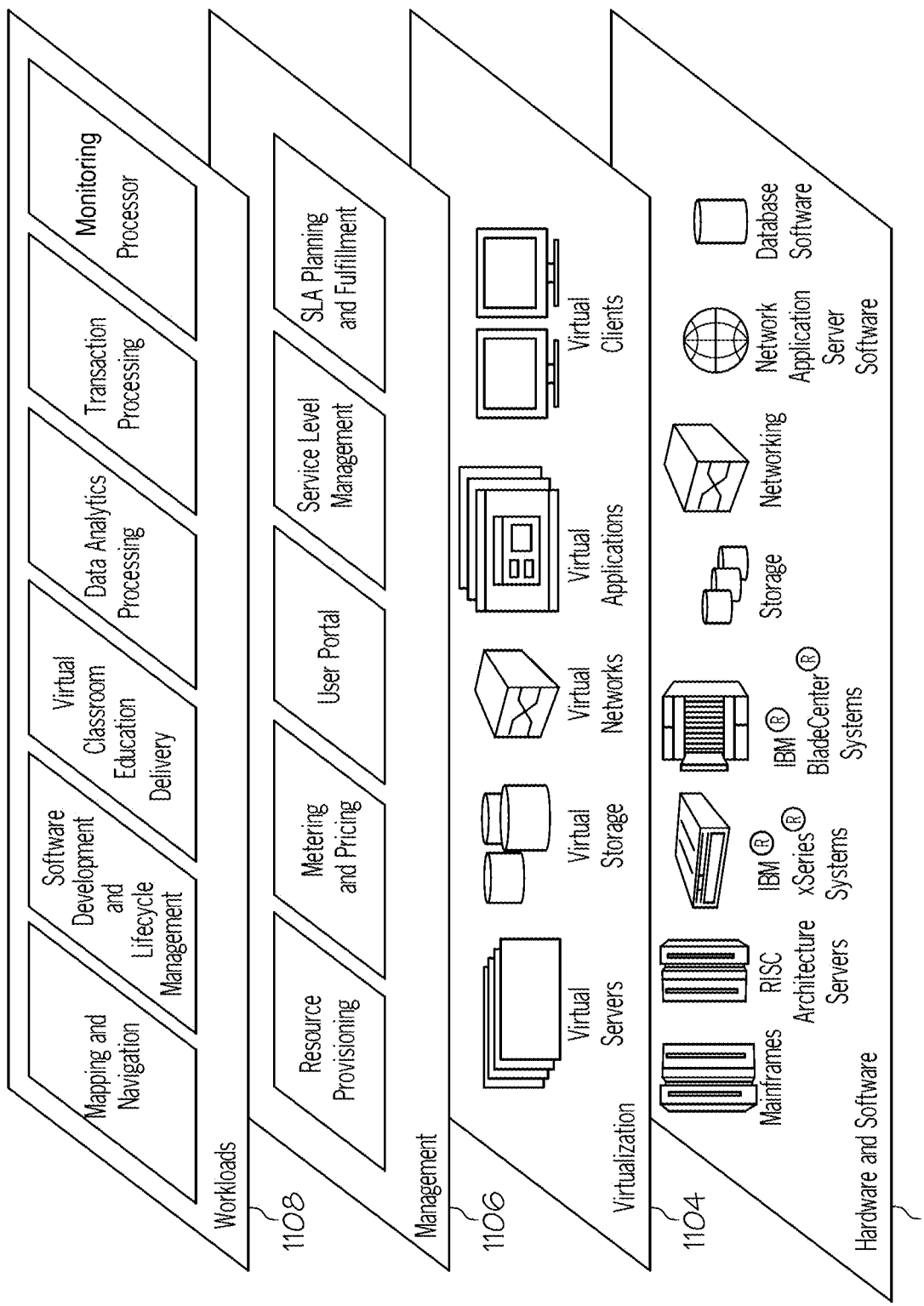
FIG. 11 illustrates abstraction model layers according to one example of the present disclosure.

Cloud Environment—FIGS. 10 and 11

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, illustrative cloud computing environment 1002 is depicted. As shown, cloud computing environment 1002 comprises one or more information processing systems 902 with which local computing devices used by cloud consumers, such as, for example, personal digital assistant (PDA) or cellular telephone 1004, desktop computer 1006, laptop computer 1008, and/or automobile computer system 1010 may communicate. Each node within the environment 1002 may communicate with one another. They may be grouped (not shown) physically or virtually, in one or more networks, such as Private, Community, Public, or Hybrid clouds as described hereinabove, or a combination thereof. This allows cloud computing environment 1002 to offer infrastructure, platforms and/or software as services for which a cloud consumer does not need to maintain resources on a local computing device. It is understood that the types of computing devices 1004, 1006, 1008, 1010 shown in FIG. 10 are intended to be illustrative only and that computing nodes 902 and cloud computing environment 1002 can communicate with any type of computerized device over any type of network and/or network addressable connection (e.g., using a web browser).

Referring now to FIG. 11, a set of functional abstraction layers provided by cloud computing environment 1002 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload processing.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including although not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

The description of the present disclosure has been presented for purposes of illustration and description, however it is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for pro-active mobile refueling of a target vehicle, the computer-implemented method comprising:

at a remote processor-based device monitoring a fuel status of the target vehicle while the target vehicle is in motion by receiving fuel status data by the remote processor-based device from the target vehicle over a wireless network;

generating, using the remote processor-based device, a map with positions of multiple moving target vehicles and multiple service agents;

receiving, from a target vehicle computer over a wireless communication network by the remote processor-based device, an indicator that a fuel level of the target vehicle has fallen below a threshold level, wherein the fuel level measures one of: petrol, diesel, battery power, and current;

determining, using the remote processor-based device, an availability/unavailability of convenient refueling stations located on a projected route of the target vehicle;

communicating, over the wireless communication network from the remote processor-based device, the availability/unavailability of the convenient refueling stations to an operator of the target vehicle; and responsive to the indicator that the fuel level of the target vehicle has fallen below the threshold level and the operator requesting, over the wireless communication network from the target vehicle device, the pro-active mobile refueling, performing:

generating, by the remote processor-based device, a distance matrix of current distances between available service agents and a subset of the multiple moving target vehicles currently tracked by service agents using a compressed distance database;

computing, by the remote processor-based device, an assignment between a service agent and the target vehicle to reach the target vehicle and perform a replenishing, wherein the service agent is assigned in an optimized order based on a current location of the target vehicle, disregarding any possible future movements of the target vehicle using a compressed path database;

iteratively receiving, by the remote processor over the wireless communications network, vehicle location position information from the target vehicle;

iteratively computing, by the remote processor-based device based on iteratively receiving vehicle location position information, moves guiding the assigned service agent to the target vehicle while the target vehicle is moving in order to finish a chase in a shortest period of time;

iteratively sending the moves from the remote processor-based device to the service agent to dispatch, the assigned service agent to reach the target vehicle and perform the replenishing, wherein the target vehicle can remain in motion until the assigned service agent has reached the target vehicle; and continually updating, by the remote processor-based device, the current location of the target vehicle.

2. The computer-implemented method of claim 1 further comprising continually re-computing the assignment until a service agent reaches the target vehicle to maintain the optimal order, wherein continually re-computing the assignment results in dynamically reassigning another service agent to reach the target vehicle.

3. The computer-implemented method of claim 1 wherein the pro-active mobile refueling includes fuel selected from a group consisting of: refilling with petrol, refilling with diesel, charging a battery, and replacing a battery.

4. The computer-implemented method of claim 1 further comprising subscribing the target vehicle to a subscription service for performing the pro-active mobile refueling.

5. The computer-implemented method of claim 1 wherein determining that the target vehicle will need replenishing is based on at least one of: a projected route of the target vehicle, and a confirmation from an operator of the target vehicle.

6. The computer-implemented method of claim 2 wherein the target vehicle is an electric vehicle, and wherein monitoring the fuel status comprises receiving a battery charge indicator.

7. The computer-implemented method of claim 1 wherein computing the assignment comprises:
    finding a minimum weight w in the distance matrix such that after removing all edges with larger weight than w, there still exists one perfect match of service agent to target vehicle; and
    finding a minimum weight bipartite match in the map after removing all edges with larger weight than w.

8. The computer-implemented method of claim 1 further comprising providing instructions to an operator of the target vehicle.

9. The computer-implemented method of claim 1 further comprising overriding a manufacturer-recommended threshold level.

10. An information processing system for pro-active mobile refueling of a target vehicle, the information processing system comprising:
    a service computer monitoring a fuel status of the target vehicle, the service computer comprising:
    memory storing instructions;
    a location-determining system; and
    a remote processor-based device operably coupled with the location-determining system and the memory and executing the instructions stored therein, the remote processor based-device for monitoring a fuel status of the target vehicle while the target vehicle is in motion by receiving fuel status data by the remote processor-based device from the target vehicle over a wireless network, the instructions comprising:
    generating, using the remote processor-based device, a map with positions of multiple moving target vehicles and multiple service agents;
    receiving, from a target vehicle computer over a wireless communication network by the remote processor-based device, an indicator that a fuel level of the target vehicle has fallen below a threshold level, wherein the fuel level measures one of: petrol, diesel, battery power, and current;
    determining, using the remote processor-based device, an availability/unavailability of convenient refueling stations located on a projected route of the target vehicle;
    communicating, over the wireless communication network from the remote processor-based device, the availability/unavailability of the convenient refueling stations to an operator of the target vehicle; and
    responsive to the indicator that the fuel level of the target vehicle has fallen below the threshold level and the operator requesting, over the wireless communication network from the target vehicle device, the pro-active mobile refueling, performing:
        generating, by the remote processor-based device, a distance matrix of current distances between available service agents and a subset of the multiple moving target vehicles currently tracked by service agents using a compressed distance database;
        computing, by the remote processor-based device, an assignment between a service agent and the target vehicle to reach the target vehicle and perform a replenishing, wherein the service agent is assigned in an optimized order based on a current location of the target vehicle, disregarding any possible future movements of the target vehicle using a compressed path database;
        iteratively receiving, by the remote processor over the wireless communications network, vehicle location position information from the target vehicle;
        iteratively computing, by the remote processor-based device based on iteratively receiving vehicle location position information, moves guiding the assigned service agent to the target vehicle while the target vehicle is moving in order to finish a chase in a shortest period of time;
        iteratively sending the moves from the remote processor-based device to the service agent to dispatch, the assigned service agent to reach the target vehicle and perform the replenishing, wherein the target vehicle can remain in motion until the assigned service agent has reached the target vehicle; and
        continually updating, by the remote processor-based device, the current location of the target vehicle.

11. The information processing system of claim 10 wherein the instructions further comprise continually re-computing the assignment until the assigned service agent reaches the moving target vehicle to maintain the optimal order, wherein continually re-computing the assignment results in dynamically reassigning another service agent to reach the moving target vehicle.

12. The information processing system of claim 10 wherein the pro-active mobile refueling includes fuel selected from a group consisting of: refilling with petrol, refilling with diesel, charging a battery, and replacing a battery.

13. The information processing system of claim 10 wherein the pro-active mobile refueling is provided to the target vehicle as a subscription service.

14. The information processing system of claim 10 wherein the instructions for computing the assignment comprise:
- finding a minimum weight w in the distance matrix such that after removing all edges with larger weight than w, there still exists one perfect match of service agent to target vehicle; and
- finding a minimum weight bipartite match in the map after removing all edges with larger weight than w.

15. The information processing system of claim 10 wherein the instructions further comprise overriding a manufacturer-recommended threshold level.

16. A computer program product for pro-active mobile refueling of a target vehicle, the computer program product comprising:
- a non-transitory storage medium readable by a remote processor-based device and storing instructions for execution by the remote processor-based device for performing a method by the remote processor-based device monitoring a fuel status of the target vehicle while the target vehicle is in motion by receiving fuel status data by the remote processor-based device from the target vehicle over a wireless network, the method comprising:
- generating, using the remote processor-based device, a map with positions of multiple moving target vehicles and multiple service agents;
- receiving, from a target vehicle computer over a wireless communication network by the remote processor-based device, an indicator that a fuel level of the target vehicle has fallen below a threshold level, wherein the fuel level measures one of: petrol, diesel, battery power, and current;
- determining, using the remote processor-based device, an availability/unavailability of convenient refueling stations located on a projected route of the target vehicle;
- communicating, over the wireless communication network from the remote processor-based device, the availability/unavailability of the convenient refueling stations to an operator of the target vehicle; and
- responsive to the indicator that the fuel level of the target vehicle has fallen below the threshold level and the operator requesting, over the wireless communication network from the target vehicle device, the pro-active mobile refueling, performing:
- generating, by the remote processor-based device, a distance matrix of current distances between available service agents and a subset of the multiple moving target vehicles currently tracked by service agents using a compressed distance database;
- computing, by the remote processor-based device, an assignment between a service agent and the target vehicle to reach the target vehicle and perform a replenishing, wherein the service agent is assigned in an optimized order based on a current location of the target vehicle, disregarding any possible future movements of the target vehicle using a compressed path database;
- iteratively receiving, by the remote processor over the wireless communications network, vehicle location position information from the target vehicle;
- iteratively computing, by the remote processor-based device based on iteratively receiving vehicle location position information, moves guiding the assigned service agent to the target vehicle while the target vehicle is moving in order to finish a chase in a shortest period of time;
- iteratively sending the moves from the remote processor-based device to the service agent to dispatch, the assigned service agent to reach the target vehicle and perform the replenishing, wherein the target vehicle can remain in motion until the assigned service agent has reached the target vehicle; and
- continually updating, by the remote processor-based device, the current location of the target vehicle.

17. The computer program product of claim 16 wherein the method further comprises continually re-computing the assignment until the assigned service agent reaches the moving target vehicle to maintain the optimal order, wherein continually re-computing the assignment results in dynamically reassigning another service agent to reach the moving target vehicle.

18. The computer program product of claim 16 wherein computing the assignment comprises:
- finding a minimum weight w in the distance matrix such that after removing all edges with larger weight than w, there still exists one perfect match of service agent to target vehicle; and
- finding a minimum weight bipartite match in the map after removing all edges with larger weight than w.

19. The computer program product of claim 16 wherein the method further comprises overriding a manufacturer-recommended threshold level.

* * * * *